United States Patent
Del Gaizo et al.

(10) Patent No.: US 10,457,114 B2
(45) Date of Patent: Oct. 29, 2019

(54) ACTIVE ENGINE HOOD VENTING SYSTEMS AND CONTROL LOGIC FOR OPERATING ACTIVE HOOD VENTS

(71) Applicant: GM GLOBAL TECHNOLOGY OPERATIONS LLC, Detroit, MI (US)

(72) Inventors: Steven A. Del Gaizo, Madison Heights, MI (US); William Fang, Bloomfield Hills, MI (US); Ethan A. McMillan, Oak Park, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 113 days.

(21) Appl. No.: 15/655,116

(22) Filed: Jul. 20, 2017

(65) Prior Publication Data

US 2019/0023101 A1    Jan. 24, 2019

(51) Int. Cl.
| | | |
|---|---|---|
| *B60H 1/00* | (2006.01) | |
| *B60K 11/08* | (2006.01) | |
| *F01P 7/02* | (2006.01) | |
| *F01P 7/04* | (2006.01) | |
| *F01P 7/08* | (2006.01) | |
| *F01P 7/10* | (2006.01) | |

(52) U.S. Cl.
CPC ..... *B60H 1/00828* (2013.01); *B60H 1/00864* (2013.01); *B60K 11/085* (2013.01); *F01P 7/026* (2013.01); *F01P 7/048* (2013.01); *F01P 7/08* (2013.01); *F01P 7/10* (2013.01); *F01P 7/088* (2013.01); *F01P 2023/08* (2013.01); *F01P 2025/32* (2013.01); *F01P 2025/48* (2013.01)

(58) Field of Classification Search
CPC ....... B60K 11/06; B60K 11/08; B60K 11/085; F01P 7/10; F01P 7/12
See application file for complete search history.

(56) References Cited

U.S. PATENT DOCUMENTS

| | | |
|---|---|---|
| 4,867,397 A | 9/1989 | Pamadi et al. |
| 5,280,990 A | 1/1994 | Rinard |
| 5,360,252 A | 11/1994 | Larsen |
| 5,908,217 A | 6/1999 | Englar |
| 6,283,407 B1 | 9/2001 | Hakenesch |
| 7,059,664 B2 | 6/2006 | Aase et al. |
| 7,192,077 B1 | 3/2007 | Hilleman |

(Continued)

*Primary Examiner* — Eric S Ruppert
(74) *Attorney, Agent, or Firm* — Quinn IP Law

(57) ABSTRACT

Disclosed are active engine compartment venting systems, methods for making and using such systems, and vehicles equipped with an active engine compartment vent and control logic for operating the vent. A method is disclosed for regulating operation of an active venting device fluidly coupled to a vent in an engine hood of a motor vehicle. The method includes a vehicle controller determining if a calibrated vehicle venting condition exists, and determining if a calibrated vehicle speed condition exists. Responsive to determining that the calibrated vehicle venting condition exists, the controller commands the active venting device to transition to an open state and thereby unobstruct the vent and allow venting fluid flow therethrough. Conversely, in response to determining that the calibrated vehicle speed condition exists, the controller commands the active venting device to transition to a closed state to thereby obstruct the vent and restrict venting fluid flow therethrough.

20 Claims, 2 Drawing Sheets

(56) References Cited

U.S. PATENT DOCUMENTS

| | | |
|---|---|---|
| 7,255,387 B2 | 8/2007 | Wood |
| 7,431,381 B2 | 10/2008 | Wood |
| 8,196,994 B2 | 6/2012 | Chen |
| 8,607,744 B2 | 12/2013 | Alexander et al. |
| 8,887,846 B2 | 11/2014 | Yoo |
| 9,132,904 B2 | 9/2015 | Durham |
| 2009/0026797 A1 | 1/2009 | Wood |
| 2010/0181799 A1 | 7/2010 | Ryan et al. |
| 2011/0068604 A1 | 3/2011 | Neuberger et al. |
| 2011/0095564 A1 | 4/2011 | Chen |
| 2011/0095566 A1 | 4/2011 | Chen |
| 2011/0148140 A1 | 6/2011 | Benton |
| 2011/0175395 A1 | 7/2011 | Guigne et al. |
| 2013/0062908 A1 | 3/2013 | Henderson et al. |
| 2015/0343892 A1* | 12/2015 | Kolhouse ............ B60K 11/085 165/287 |
| 2015/0343894 A1* | 12/2015 | Yoshioka ............ B60K 11/085 180/68.1 |
| 2018/0297650 A1* | 10/2018 | Titus ...................... B62D 37/02 |

\* cited by examiner

ACTIVE ENGINE HOOD VENTING SYSTEMS AND CONTROL LOGIC FOR OPERATING ACTIVE HOOD VENTS

INTRODUCTION

The present disclosure relates generally to venting systems for motor vehicles. More specifically, aspects of this disclosure relate to active engine compartment venting systems and related control logic for regulating operation of an engine hood vent to reduce aerodynamic drag and improve power train cooling (PTC) performance.

Many current-production motor vehicles, such as the modern-day automobile, are originally equipped with or retrofit to employ stock body hardware and aftermarket accessories engineered to improve the vehicle's aerodynamic characteristics. Air dams and splitters, for example, modify the flow of air passing under the vehicle body to balance the distribution of fore and aft downforce. As the name implies, an air dam is a fluid barrier structure mounted underneath or integrated with the front-end bumper structure, extending downward into proximity with the roadway. Air dams—or colloquially "front spoilers"—enhance vehicle aerodynamics and stability by blocking and redirecting the flow of turbulent air passing under the chassis. Splitters, on the other hand, typically appear as a flat extension projecting from the bottom of the front bumper, extending forward and parallel to the ground. A splitter acts like a wedge that forces high pressure air upwards and over the vehicle, and forces high speed, low pressure air underneath the car, resulting in a net positive downforce.

While splitters and air dams are designed to modify the aerodynamic characteristics at the front end of a vehicle, spoilers and diffusers operate to modify aerodynamic flow at the rear end of a vehicle. An air spoiler is normally anchored on top of the trunk lid or rear roof rail, and is shaped similar in geometry to an inverted airfoil. Spoilers are designed to modify airflow aft of the vehicle and to generate an aerodynamic pressure gradient that produces downforce on the rear tires. A rear diffuser, on the other hand, uses a series of specially formed channels arranged along the aft part of the vehicle underbody. These channels improve the vehicle's aerodynamic properties by ameliorating the transition between high-velocity airflow along the undercarriage and the much slower freestream airflow of surrounding ambient air. Generally speaking, a rear diffuser helps underbody airflow to decelerate and expand by providing pressure recovery so that it does not cause excessive flow separation and drag.

Conventional automobiles employ reciprocating-piston type internal combustion engines to propel the vehicle and power the onboard vehicle electronics. Hybrid and full-electric vehicles, on the other hand, utilize alternative power sources, such as an electric motor-generator, to propel the vehicle and minimize or eliminate reliance on an engine for power. For many powertrain designs, the prime mover—whether engine or motor—is mounted in a dedicated engine compartment (or "engine bay") aft of the front bumper structure. An engine hood (or "bonnet" in some countries) extends over and covers the vehicle's engine compartment to prevent theft or damage of the powertrain components and, when opened, allows access to the compartment for maintenance and repair. On passenger cars, the engine hood is typically hinged to a forward cross-member underneath the dashboard panel or to lateral engine compartment rails of the body in white (BIW). The forward end of the engine hood is secured to a front bulkhead or tie bar cross-member via a releasable latching mechanism. For motor vehicles with a mid-engine or a rear-engine layout, the engine compartment and, thus, the hood are located towards the middle or rear of the vehicle as opposed to the forward location of most conventional vehicle designs.

During normal operation, internal combustion engine (ICE) assemblies and large traction motors (i.e., for hybrid and full-electric powertrains) generate a significant amount of heat that is radiated into the vehicle's engine compartment. To prolong the operational life of the prime mover(s) and the various components packaged within the engine compartment, most automobiles are equipped with passive and active features for cooling the engine compartment. Possible measures for alleviating excessive heating within the engine compartment include, for example, thermal wrapping the exhaust runners and thermal coating of the headers and manifolds. Active means for cooling the engine compartment include high-performance radiators, high-output coolant pumps, and electric cooling fans. As another option, some vehicle hood assemblies are provided with air vents designed to expel hot air and amplify convective cooling within the engine compartment. In addition to cooling the engine compartment, engine hood vents cooperate with the front grille cover to reduce flow separation and resultant eddy currents caused by the moving vehicle penetrating freestream ambient air.

SUMMARY

Disclosed herein are active engine compartment venting systems, methods for making and methods for using such systems, and motor vehicles equipped with an active engine compartment vent and programmable control logic for regulating operation of the vent. By way of example, and not limitation, there is presented a novel active engine hood vent architecture designed to relieve engine bay back pressure, and to allow exit flow from the condenser, radiator and fan module (CRFM) to expel through the engine hood. This reduction in back pressure in the engine compartment helps to reduce front lift forces and increase radiator flow rates. In addition, the active vent architecture employs an automated flow control element, such as motor-driven shutter vanes or shape memory alloy (SMA) actuated louvers, to selectively close the vent and, thus, reduce aerodynamic drag that dominates at higher vehicle speeds.

During calibrated "venting" vehicle conditions, such as a hard turn, an active CRFM fan, or engine temps exceeding a threshold maximum temperature, the active hood vent is automatically opened. Conversely, during calibrated "anti-drag" vehicle conditions, e.g., if the vehicle is moving at or above a calibrated highway cruise speed, the active hood vent is automatically closed. For some applications, radiator airflow may be increased by about 3 to 7 cubic meters per minute (CMM) while concomitantly reducing front lift force coefficient (CLF) by about 0.010 to 0.015 CLF when the active hood vent is in an open state. Conversely, when the active hood vent is in a closed state, aerodynamic drag coefficient (CD) may be reduced by about 0.004 to 0.007 CD. Optional system architectures also employ an active shutter system for the front grille cover; in this instance, the grille shutters and hood vents may be simultaneously opened and closed for added aerodynamic and PTC performance.

Aspects of the present disclosure are directed to control algorithms for operating an engine compartment venting system. Disclosed, for example, is a method for regulating operation of an active venting device that is fluidly coupled to a vent in the engine hood of a motor vehicle. The active venting device is automated to switch between a closed state, whereat the device obstructs or otherwise at least partially seals the engine hood vent, and an open state, whereat the venting device unobstructs or otherwise at least partially unseals the vent. The method includes, in any order and in any combination with any of the disclosed features: determining, via an onboard or remote vehicle controller, if a calibrated vehicle venting condition exists; determining, via the vehicle controller, if a calibrated vehicle speed condition exists; in response to determining that the calibrated vehicle venting condition exists, transmitting a first command signal to the active venting device to transition to the open state and thereby allow venting fluid flow through the vent; and, in response to determining that the calibrated vehicle speed condition exists, transmitting a second command signal to the active venting device to transition to the closed state and thereby restrict the venting fluid flow through the vent.

For any of the disclosed embodiments, the calibrated vehicle venting condition may include the motor vehicle executing a hard turn operation. For vehicle applications in which an engine cooling fan is located within the engine compartment, the calibrated vehicle venting condition may include the cooling fan being in an on state. For vehicle applications that employ an internal combustion engine assembly, the calibrated vehicle venting condition may include an engine operating temperature of the ICE assembly exceeding a calibrated nominal engine temperature. Determining that a calibrated vehicle venting condition exists may require both the engine operating temperature exceeding the calibrated nominal engine temperature and the motor vehicle driving at a current speed that is above a calibrated highway cruise speed. For any of the disclosed embodiments, the calibrated vehicle venting condition may include an engine compartment temperature exceeding a calibrated nominal engine compartment temperature. Optionally, the calibrated vehicle speed condition may include the motor vehicle driving at and maintaining a calibrated highway cruise speed.

Other aspects of the present disclosure are directed to motor vehicles equipped with an active engine compartment vent and control logic for regulating operation of the vent. A "motor vehicle," as used herein, may include any relevant vehicle platform, such as passenger vehicles (internal combustion engine, hybrid, full electric, fuel cell, fully or partially autonomous, etc.), commercial vehicles, industrial vehicles, tracked vehicles, off-road and all-terrain vehicles (ATV), farm equipment, boats, airplanes, etc. A motor vehicle is disclosed that includes a vehicle body with an engine compartment, a prime mover (e.g., engine and/or traction motor) mounted inside the engine compartment, and a vented engine hood covering an access opening to the engine compartment. An active venting device, which is fluidly coupled to the vent in the engine hood, is automated to selectively switch between closed and open states to respectively obstruct/seal and unobstruct/unseal the vent.

The motor vehicle also includes a vehicle controller, such as a programmable electronic control unit (ECU) or powertrain control module, that communicates with the active venting device. The vehicle controller is programmed to determine if a calibrated vehicle venting condition exists, and to determine if a calibrated vehicle speed condition exists. In response to the occurrence of a calibrated vehicle venting condition, the controller commands the active venting device to transition to the open state and unobstruct the vent such that venting fluid flow can pass through the vent. Conversely, if a calibrated vehicle speed condition occurs, the controller commands the active venting device to transition to the closed state and obstruct the vent such that venting fluid flow through the vent is restricted.

Additional aspects of the present disclosure are directed to non-transitory, computer readable media storing instructions executable by at least one of one or more processors of one or more in-vehicle electronic control units. These instructions, when executed, cause the ECU(s) to perform various operations, which may include, in any order and in any combination with any features presented in this disclosure: determining if a calibrated vehicle venting condition exists; determining if a calibrated vehicle speed condition exists; responsive to a determination that the calibrated vehicle venting condition exists, transmitting a first command signal to the active venting device to transition to the open state and thereby allow venting fluid flow through the vent; and responsive to a determination that the calibrated vehicle speed condition exists, transmitting a second command signal to the active venting device to transition to the closed state and thereby restrict the venting fluid flow through the vent.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims.

Figure 1:
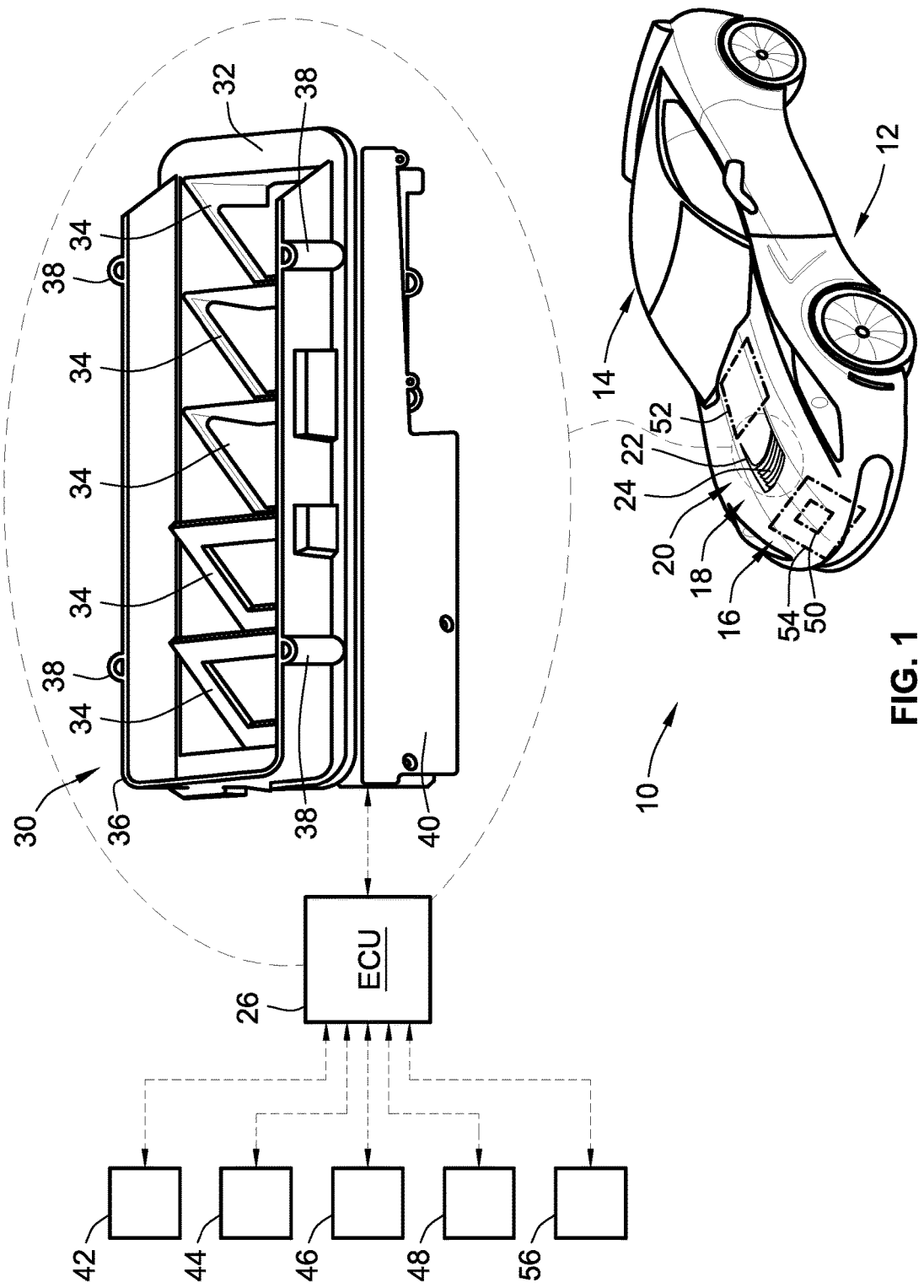
FIG. 1 is an elevated perspective-view illustration of a representative motor vehicle with an inset view of a representative active engine hood vent assembly in accordance with aspects of the present disclosure.

The present disclosure is amenable to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of this disclosure as defined by the appended claims.

DETAILED DESCRIPTION

This disclosure is susceptible of embodiment in many different forms. There are shown in the drawings and will herein be described in detail representative embodiments of the disclosure with the understanding that these illustrated examples are to be considered an exemplification of the disclosed principles and do not limit the broad aspects of the disclosure to the representative embodiments. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" and synonyms thereof mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Referring now to the drawings, wherein like reference numbers refer to like features throughout the several views, there is shown in FIG. 1 a representative automobile, which is designated generally at 10 and portrayed herein for purposes of discussion as a two-seat, coupe-style passenger vehicle. Mounted to the vehicle body 12, e.g., in a "flip-front" configuration hinged to a radiator bulkhead wall or tie bar cross-member forward of a vehicle passenger compartment 14, is an engine hood assembly 16 that extends across and covers an engine compartment 18. The illustrated automobile 10—also referred to herein as "motor vehicle" or "vehicle" for short—is merely an exemplary application with which aspects and features of this disclosure may be practiced. In the same vein, implementation of the present concepts for an engine hood should be appreciated as a representative application of the novel aspects and features disclosed herein. As such, it will be understood that aspects and features of this disclosure may be integrated into any type of engine-mount layout, applied to other compartment closure assemblies, and implemented for any logically relevant type of motor vehicle. Lastly, the drawings presented herein are not necessarily to scale and are provided purely for instructional purposes. Thus, the specific and relative dimensions shown in the drawings are not to be construed as limiting.

Vented engine hood assembly 16 of FIG. 1 may be pivotally mounted, e.g., via a dual-point hinge with pneumatic cylinder actuators, to one or more structural load-bearing body frame members, such as a front upper tie bar, to provide access to and securely close the top portion of the engine compartment 18. The engine hood assembly 16 can be provided with a concealed latch system (not shown) for securing the hood assembly 16 in a closed position. A hood latch handle of the latch system, which may be located inside the passenger compartment, e.g., underneath the steering column or adjacent the driver seat frame, is pulled, pivoted or otherwise activated to apply a tensile force to a hood release cable. The loaded hood release cable, which may be a Bowden-type cable, activates a spring-biased hood latch assembly at the aft end of the engine hood assembly 16 opposite the hinge mount. This allows the engine hood assembly 16 to be moved to an open position, e.g., under the biasing force of one or more air cylinders. Other mounting and latching mechanisms, including mechanical and electromechanical architectures, are envisioned as being within the scope of the present disclosure.

With continuing reference to FIG. 1, the engine hood assembly 16 is equipped with an active engine compartment venting system 20 that is automated, e.g., via in-vehicle electronic control unit (ECU) 26, to selectively adjust the amount of ambient air permitted to flow into, and the amount of compartment-entrained gases that is expelled out from, the vehicle's engine compartment 18. In the illustrated example, the active venting system 20 includes a hood vent generally composed of a V-shaped vent frame 22 and a series of stationary vent slats 24 (collectively "hood vent 22, 24"). Vent frame 22 circumscribes and structurally reinforces a vent hole that extends through a centrally located area of the engine hood 16. The stationary vent slats 24 are rigidly attached to, and extend between, lateral frame rails of the vent frame 22. Each vent slat 24 has an aftward pitch typified by an obliquely angled orientation with respect to the hood 16, e.g., to minimize the unwanted ingress of rain, dirt and debris while maximizing the egress of trapped gases from the engine compartment 18. While shown with a V-shaped geometry and a centralized location, the vent frame 22 and slats 24 may take on any shape and size, may be packaged at any functional location, and may be configured as necessary, e.g., to conform to the contour of the hood 16 in the desired placement location.

Mounted inside of the engine compartment 18, e.g., to an underside of the engine hood assembly 16, is an active venting device, which is designated generally at 30 in the inset view of FIG. 1. This active venting device 30 is fluidly coupled to the hood vent 22, 24 and operable to open and close fluid communication between the interior space of the vehicle's engine compartment 18 and the ambient air flowing across the engine hood assembly 16. Open fluid communication between the engine compartment 18 and the exterior of the vehicle 10 helps to increase the flow of cooling ambient air through the engine compartment 18 and to alleviate excessive back pressure from within the compartment's interior space. The representative active venting device 30 includes a rigid housing 32 with a series of louvered shutters 34 rotatably attached to the housing 32. The housing 32 is fabricated with an integral mounting bracket 36 that includes four internally threaded slots 38 for rigidly securing the housing 32 to the engine hood 16, e.g., via screws, bolts, etc. Alternative embodiments may employ other mechanisms for mounting the housing 32 on the interior of the engine compartment 18, such as clips, snap-lock fasteners, adhesives, etc. While illustrated as an electromechanical shuttering mechanism, it should be recognized that the active venting device 30 of FIG. 1 is merely representative in nature and other venting devices could be employed to control venting fluid flow through the engine hood 16.

A shutter actuator mechanism 40 is attached to the housing 32 and wired/wirelessly connected to the vehicle ECU 26 such that the actuator mechanism 40 can receive electronic command signals from the ECU 26. The representative shutter actuator mechanism 40 of FIG. 1, which may be in the nature of a motor-driven rack-and-pinion gear train or other functionally applicable device, is governed by the ECU 26 to move the shutters 34 in unison between an open position/state and a closed position/state. When transitioned to the open state, the shutters 34 rotate (e.g., counterclockwise in FIG. 1) about respective transverse axes such that the forward-most ends of the shutters 34 displace downwardly to create a gap between neighboring shutters 34. In so doing, the active venting device 30 partially or completely unseals the hood vent 22, 24, which permits fluid to flow from the interior space of the engine compartment 18, through the engine hood assembly 16, and out to the exterior of the vehicle 10. Conversely, when transitioned to the closed state, the shutters 34 rotate (e.g., clockwise in FIG. 1) such that the forward-most ends of the shutters 34 displace upwardly to abut a neighboring shutter 34 or the housing 32. In so doing, the active venting device 30 partially or completely seals the hood vent 22, 24, which obstructs or otherwise prevents fluid flow from the interior of the engine compartment 18 to the exterior of the vehicle 10 through the engine hood assembly 16. While the venting device 30 shown and described in the Figures includes five shutters 34, it is envisioned that the venting device 30 comprise any number of active shutters. Moreover, the pivoting arrangement of the shutters 24 can be substituted with a sliding arrangement or replaced altogether with a fluid valve assembly.

Figure 2:
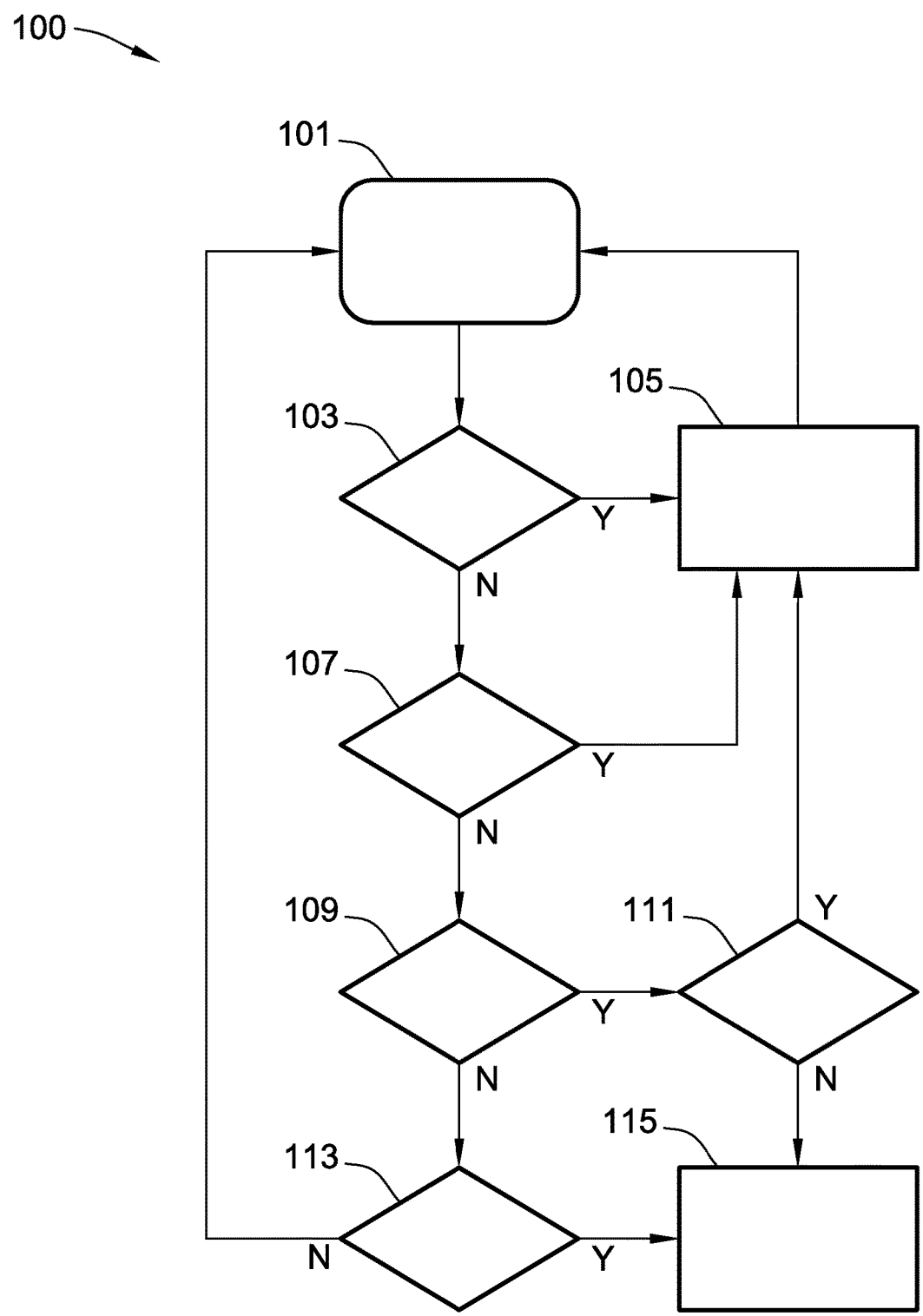
FIG. 2 is a flowchart for a representative active engine hood vent control protocol that may correspond to memory-stored instructions executed by onboard control-logic circuitry, programmable electronic control unit, or other computer-based device of a motor vehicle in accord with aspects of the disclosed concepts.

With reference now to the flow chart of FIG. 2, an improved method or control strategy for operating an automated engine compartment venting mechanism, such as active venting device 30 of FIG. 1, to regulate the flow of fluid through a compartment closure assembly, such as vent 22, 24 of engine hood assembly 16, is generally described at 100 in accordance with aspects of the present disclosure. Some or all of the operations illustrated in FIG. 2 and described in further detail below can be representative of an algorithm that corresponds to processor-executable instructions that can be stored, for example, in main or auxiliary or remote memory, and executed, for example, by an ECU, a central processing unit (CPU), an on-board or remote control logic circuit, or other module or device, to perform any or all of the above and/or below described functions associated with the disclosed concepts.

Method 100 of FIG. 2 starts at terminal block 101 with initiating an engine compartment venting protocol. In essence, terminal block 101 could be replaced with a decision block for a powertrain control module or vehicle controller to assess whether or not the venting protocol is needed. For instance, the vehicle ECU 26 of FIG. 1 may execute memory stored instructions to determine if vehicle operating conditions or ambient weather conditions necessitate active venting of the engine compartment. By way of non-limiting example, a vehicle operating in subzero temperatures likely does not require venting of the engine compartment; in such weather conditions, the ECU 26 may terminate the engine compartment venting protocol. As another example, a hybrid vehicle may operate in electric-only driving mode, with the engine off, whenever the vehicle is traveling at speeds under 40 miles per hour (mph); under such operating conditions, venting of the engine compartment may be deemed unnecessary and, thus, the venting protocol may be terminated. Optional applications may require receiving an activation input from the vehicle driver or other occupant through an electronic driver information center (DIC), which may be implemented through a touch-screen video display panel that is positioned in a center stack of the passenger compartment. For some applications, terminal block 101 is merely an initialization operation (START) that does not require actively determining whether or not the control protocol has been activated or is otherwise desirable.

Once initiated, the method 100 determines if a calibrated vehicle venting condition is present that would benefit from venting the engine bay. At decision block 103, for example, processor-executable instructions cause a vehicle controller, such as ECU 26, to monitor, detect or otherwise determine if the motor vehicle is executing a hard turn operation. By way of example, and not limitation, the motor vehicle 10 of FIG. 1 is equipped with a single-axis lateral or a triple-axes performance accelerometer 42 that is designed to detect lateral vehicle acceleration. When a vehicle turn is initiated, ECU 26 may poll or prompt the accelerometer 42 to begin monitoring lateral vehicle acceleration. Sensor-generated signals may be received, logged and analyzed via ECU 26 to determine if the vehicle's lateral acceleration exceeds a baseline hard-turn acceleration value (e.g., 0.8 G), which is indicative of a hard turn. Optionally or alternatively, the motor vehicle 10 may be equipped with a position encoder, rotational transducer, or other steering wheel sensor 44 that monitors the position, displacement, and/or turning rate of the steering wheel. Sensor-generated signals may be received, logged and analyzed via ECU 26 to determine if any of these steering wheel characteristics indicate that a hard turn is being executed (e.g., steering wheel position is within a calibrated hard-turn position range of about 65 to 360 degrees from top dead center). If a determination is made that the motor vehicle is executing a hard turn operation (Block 103=YES) and, thus, a calibrated vehicle venting condition exists, the method 100 proceeds to process block 105 with instructions that cause the ECU 26 to transmit a VENT OPEN command signal to the active venting device 30. This first command signal triggers the shutter actuator mechanism 40 to transition the louvered shutters 34 to the open state such that venting fluid flow is allowed to pass through the engine hood vent 22, 24.

Other calibrated vehicle venting conditions may occur that could elicit venting of the engine bay. As yet another non-limiting example, if a determination is made that the vehicle is not executing a hard turn operation (Block 103=NO), the method 100 of FIG. 2 proceed to decision block 107 to determine if an engine cooling device has been activated to cool the prime mover(s). The representative vehicle 10 of FIG. 1, for example, includes a motor-driven or fan-belt-driven radiator fan (shown schematically with hidden lines at 50) that is located within the engine compartment 18 and selectively actuatable to force air across an internal combustion engine assembly 52. According to the illustrated example, the vehicle 10 also includes a radiator 54 or other heat exchange device used for cooling internal combustion engines. In this instance, one of the calibrated vehicle venting conditions involves the cooling fan 50 being in an on state to convectively cool the ICE assembly 52 and the radiator 54. A fan sensor 46 packaged within the engine compartment 16 is operable to detect a radiator operating temperature, such as a real-time temperature of engine coolant fluid circulating through the radiator 54. Sensor-generated signals received from the fan sensor 46 may be logged and analyzed via ECU 26 to determine if the radiator operating temperature exceeds a calibrated nominal radiator temperature value, which indicates that the electric cooling fan 50 is in the on state. For alternative vehicle platforms, the fan sensor 46 may be a thermostatic switch that automatically turns the radiator fan on and off depending upon engine compartment temperature. Optionally, the fan sensor 46 may be omitted altogether, e.g., in powertrain configurations where the radiator fan 50 and radiator 54 are controlled by an engine control unit or powertrain control module (PCM). If it is determined that the radiator fan 50 is on (Block 107=YES) and, thus, a calibrated vehicle venting condition exists, the method 100 proceeds to process block 105 with instructions that cause the ECU 26 to transmit a VENT OPEN command signal to the active venting device 30.

Continuing with examples of calibrated vehicle venting conditions that prompt venting of the engine bay, block 111 of FIG. 2 may comprise processor-executable instructions for determining if an operating temperature of the prime mover(s) exceeds a nominal operating temperature calibrated for the corresponding powertrain. In FIG. 1, for example, the ICE assembly 52 is provided with an engine temperature sensor 48 that is mounted in, on, or proximate to the engine's cylinder block. For at least some embodiments, this sensor 48 is operable to detect a real-time temperature of engine coolant fluid circulating through the engine block. Using these sensor-generated signals, the ECU 26 can calculate a real-time engine temperature and, from these calculations, determine if the engine's operating temperature exceeds a calibrated nominal engine temperature (e.g., about 240° F. or about 115° C.). Engine temperature sensor 48 may be operable to monitor other engine parameters indicative of engine operating temperature. By way of example, decision block 111 may require determining if a real-time engine compartment temperature exceeds a calibrated nominal engine compartment temperature. In this instance, temperature sensor 48 may be operable to detect engine compartment air temperature; ECU 26 processes these sensor signals to determine if the engine compartment air temperature is above a calibrated nominal air temperature. In any case, if the engine temperature is above nominal (Block 111=YES) and, thus, a calibrated vehicle venting condition exists, the method 100 proceeds to process block 105 with instructions that cause the ECU 26 to transmit a VENT OPEN command signal to the active venting device 30.

Prior to executing the operation of decision block 111, but after determining that the radiator fan 50 is not on (Block 107=NO), the representative method of FIG. 2 may require determining, at decision block 109, if the motor vehicle is driving at a speed in excess of a calibrated highway cruise speed (e.g., above approximately 55 mph or approximately 65 mph, depending upon vehicle platform). For instance, the ECU 26 may communicate with a vehicle speed sensor (VSS) 56 to determine, in real-time, a current vehicle speed and whether or not that speed is above highway cruise speed. Additionally, block 109 may require determining if the vehicle is executing an acceleration or deceleration maneuver at speeds above the calibrated highway cruise speed. In this instance, a calibrated vehicle venting condition exists when both the vehicle speed is above the calibrated highway cruise speed (Block 109=YES) and the engine operating temperature exceeding the calibrated nominal engine temperature (Block 111=YES). If the engine temperature is below nominal (Block 111=NO) and, thus, a calibrated vehicle venting condition does not exist, the method 100 proceeds to process block 115 with instructions that cause the ECU 26 to transmit a VENT CLOSE command signal to the active venting device 30. This second command signal triggers the shutter actuator mechanism 40 to transition the louvered shutters 34 to the closed state such that venting fluid flow through the engine hood vent 22, 24 is reduced or prevented.

With continuing reference to FIG. 2, the method 100 also determines if a calibrated vehicle speed condition is present that would benefit from closing the vent to the engine bay. At decision block 113, for example, processor-executable instructions cause a vehicle controller, such as ECU 26, to monitor, detect or otherwise determine if the motor vehicle is driving at and, optionally, maintaining a vehicle speed that is at or below the calibrated highway cruise speed (e.g., a cruise-controlled vehicle speed of 45 mph). As indicated above, the ECU 26 may prompt with the vehicle speed sensor (VSS) 56 to determine, in real-time, a current vehicle speed; from these sensor-generated signals the ECU 26 can determine if this real-time vehicle speed is at or below highway cruise speed. If the vehicle speed is at or below highway cruise speed (Block 113=YES) and, thus, a calibrated vehicle speed condition does exist, the method 100 proceeds to process block 115 with instructions that cause the ECU 26 to transmit a VENT CLOSE command signal to the active venting device 30.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in other manners (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, additional blocks may be added, and/or some of the blocks described may be modified, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined in the appended claims. Moreover, the present concepts expressly include any and all combinations and subcombinations of the preceding elements and features.

What is claimed:

1. A method for regulating operation of an active venting device fluidly coupled to a vent in an engine hood covering an engine compartment of a motor vehicle, the motor vehicle including an engine assembly located within the engine compartment, the active venting device being switchable between closed and open states to respectively obstruct and unobstruct the vent, the method comprising:
   determining, via a vehicle controller, if a calibrated vehicle venting condition exists, the calibrated vehicle venting condition including a current speed of the motor vehicle exceeding a calibrated highway cruise speed concurrent with an engine operating temperature of the engine assembly exceeding a calibrated nominal engine temperature;
   determining, via the vehicle controller, if a calibrated vehicle speed condition exists, the calibrated vehicle speed condition including the current speed of the motor vehicle exceeding the calibrated highway cruise speed concurrent with the engine operating temperature of the engine assembly not exceeding the calibrated nominal engine temperature;
   responsive to a determination that the calibrated vehicle venting condition exists, transmitting a first command signal to the active venting device to transition to the open state and thereby allow venting fluid flow through the vent; and
   responsive to a determination that the calibrated vehicle speed condition exists, transmitting a second command signal to the active venting device to transition to the closed state and thereby restrict the venting fluid flow through the vent.

2. The method of claim 1, wherein the calibrated vehicle venting condition includes the motor vehicle executing a vehicle calibrated turn operation.

3. The method of claim 2, wherein the motor vehicle further includes an accelerometer operable to detect lateral vehicle acceleration, and wherein the determination that the motor vehicle is executing the vehicle calibrated turn operation, such that the calibrated vehicle venting condition exists, includes the vehicle controller receiving a sensor signal from the accelerometer indicating the lateral vehicle acceleration exceeds a baseline hard-turn acceleration value.

4. The method of claim 2, wherein the motor vehicle further includes a steering wheel sensor operable to detect steering wheel position, and wherein the determination that the motor vehicle is executing the vehicle calibrated turn operation, such that the calibrated vehicle venting condition exists, includes the vehicle controller receiving a sensor signal from the steering wheel sensor indicating the steering wheel position is within a calibrated hard-turn position range.

5. The method of claim 1, wherein the motor vehicle further includes an electric cooling fan and a fan sensor operable to detect a temperature of the engine compartment and automatically switch the electric cooling fan on and off depending upon the detected temperature of the engine compartment, and wherein the calibrated vehicle venting condition includes the electric cooling fan being in an on state.

6. The method of claim 1, wherein the motor vehicle further includes an electric cooling fan, a radiator, and a fan sensor located within the engine compartment, the fan sensor being operable to detect radiator operating temperature, and wherein the calibrated vehicle venting condition includes the vehicle controller determining the electric cooling fan is in an on state by receiving a sensor signal from the fan sensor indicating the radiator operating temperature exceeds a calibrated nominal radiator temperature value.

7. The method of claim 1, wherein the motor vehicle further includes an engine temperature sensor operable to detect the engine operating temperature of the engine assembly, and wherein the vehicle controller communicates with the engine temperature sensor to determine if the engine operating temperature exceeds the calibrated nominal engine temperature.

8. The method of claim 1, wherein the engine assembly further includes an engine temperature sensor mounted to an engine block and operable to detect engine coolant temperature, and wherein the determination that the engine operating temperature exceeds the calibrated nominal engine temperature, such that the calibrated vehicle venting condition exists, includes the vehicle controller receiving a sensor signal from the engine temperature sensor indicating the engine coolant temperature is above a calibrated nominal coolant temperature.

9. The method of claim 1, wherein the calibrated vehicle venting condition includes an electric cooling fan of the motor vehicle being in an off state concurrent with the engine operating temperature exceeding the calibrated nominal engine temperature and the current speed exceeding the calibrated highway cruise speed.

10. The method of claim 1, wherein the calibrated vehicle venting condition includes an engine compartment temperature exceeding a calibrated nominal engine compartment temperature.

11. The method of claim 10, wherein the motor vehicle includes a temperature sensor operable to detect engine compartment air temperature, and wherein a determination that the engine operating temperature exceeds the calibrated nominal engine temperature, such that the calibrated vehicle venting condition exists, includes the vehicle controller receiving a sensor signal from the temperature sensor indicating the engine compartment air temperature is above a calibrated nominal air temperature.

12. The method of claim 1, wherein the calibrated vehicle speed condition includes the motor vehicle driving at and maintaining a calibrated highway cruise speed.

13. A motor vehicle comprising:
   a vehicle body defining an engine compartment with an access opening;
   a prime mover mounted inside the engine compartment;
   an engine hood assembly covering the access opening and including a vent;
   an active venting device fluidly coupled to the vent in the engine hood assembly, the active venting device being automated to selectively switch between closed and open states to respectively obstruct and unobstruct the vent; and
   a vehicle controller communicatively connected to the active venting device, the vehicle controller being programmed to:
      determine if a calibrated vehicle venting condition exists, the calibrated vehicle venting condition including a current speed of the motor vehicle exceeding a calibrated highway cruise speed concurrent with an operating temperature of the prime mover exceeding a calibrated nominal temperature;
      determine if a calibrated vehicle speed condition exists, the calibrated vehicle speed condition including the current speed of the motor vehicle exceeding the calibrated highway cruise speed concurrent with the operating temperature of the prime mover not exceeding the calibrated nominal temperature;

responsive to a determination that the calibrated vehicle venting condition exists, command the active venting device to transition to the open state and thereby allow venting fluid flow through the vent; and responsive to a determination that the calibrated vehicle speed condition exists, command the active venting device to transition to the closed state and thereby restrict the venting fluid flow through the vent.

14. A non-transitory, computer readable medium storing instructions executable by an onboard vehicle controller of a motor vehicle, the motor vehicle including an engine assembly and an engine hood with a vent and an active venting device fluidly coupled to the vent, the active venting device being switchable between closed and open states to respectively obstruct and unobstruct the vent, the instructions causing the vehicle controller to perform steps comprising:

determining if a calibrated vehicle venting condition exists, the calibrated vehicle venting condition including a current speed of the motor vehicle exceeding a calibrated highway cruise speed concurrent with an engine operating temperature of the engine assembly exceeding a calibrated nominal engine temperature;

determining if a calibrated vehicle speed condition exists, the calibrated vehicle speed condition including the current speed of the motor vehicle exceeding the calibrated highway cruise speed concurrent with the engine operating temperature of the engine assembly not exceeding the calibrated nominal engine temperature;

responsive to a determination that the calibrated vehicle venting condition exists, transmitting a first command signal to the active venting device to transition to the open state and thereby allow venting fluid flow through the vent; and responsive to a determination that the calibrated vehicle speed condition exists, transmitting a second command signal to the active venting device to transition to the closed state and thereby restrict the venting fluid flow through the vent.

15. The non-transitory, computer readable medium of claim 14, wherein the calibrated vehicle venting condition includes the motor vehicle executing a vehicle calibrated turn operation.

16. The non-transitory, computer readable medium of claim 14, wherein the motor vehicle further includes an engine compartment and an electric cooling fan located within the engine compartment, and wherein the calibrated vehicle venting condition includes the electric cooling fan being in an on state.

17. The non-transitory, computer readable medium of claim 14, wherein the motor vehicle further includes an engine temperature sensor operable to detect the engine operating temperature of the engine assembly, and wherein the vehicle controller communicates with the engine temperature sensor to determine if the engine operating temperature exceeds the calibrated nominal engine temperature.

18. The non-transitory, computer readable medium of claim 14, wherein the calibrated vehicle venting condition includes an electric cooling fan of the motor vehicle being in an off state concurrent with the engine operating temperature exceeding the calibrated nominal engine temperature and the current speed exceeding the calibrated highway cruise speed.

19. The non-transitory, computer readable medium of claim 14, wherein the motor vehicle includes an engine compartment, and wherein the calibrated vehicle venting condition includes an engine compartment temperature being above a calibrated nominal engine compartment temperature.

20. The non-transitory, computer readable medium of claim 14, wherein the calibrated vehicle speed condition includes the motor vehicle driving at and maintaining a calibrated highway cruise speed.

* * * * *